US008762998B2

(12) United States Patent
Limoratto et al.

(10) Patent No.: US 8,762,998 B2
(45) Date of Patent: Jun. 24, 2014

(54) COMPUTING JOB MANAGEMENT BASED ON PRIORITY AND QUOTA

(75) Inventors: Arnaud Limoratto, Paris (FR); Eric J. F. Menguy, Roquefort les pins (FR); Noémi Murgat, Paris (FR); Carole Truntschka, Saint-Laurent-du-Var (FR)

(73) Assignee: International Business Machines Corporation, Armonk, NY (US)

( * ) Notice: Subject to any disclaimer, the term of this patent is extended or adjusted under 35 U.S.C. 154(b) by 507 days.

(21) Appl. No.: 13/179,772

(22) Filed: Jul. 11, 2011

(65) Prior Publication Data

US 2012/0324467 A1   Dec. 20, 2012

(30) Foreign Application Priority Data

Jun. 14, 2011 (EP) .................................. 11305740

(51) Int. Cl.
 *G06F 9/46* (2006.01)
(52) U.S. Cl.
 USPC ........................... 718/103; 718/102; 718/104
(58) Field of Classification Search
 None
 See application file for complete search history.

(56) References Cited

U.S. PATENT DOCUMENTS

| 7,058,951 | B2 * | 6/2006 | Bril et al. ....................... 718/104 |
| 7,437,728 | B2 * | 10/2008 | Stackhouse et al. .......... 718/104 |
| 7,509,671 | B1 | 3/2009 | Bedell et al. |
| 7,649,645 | B2 | 1/2010 | Frankel |
| 7,650,347 | B2 | 1/2010 | Mankovski et al. |
| 7,743,378 | B1 | 6/2010 | Markov |
| 7,752,622 | B1 | 7/2010 | Markov |
| 7,814,492 | B1 | 10/2010 | Creemer et al. |
| 8,015,564 | B1 * | 9/2011 | Beyer et al. ................... 718/100 |
| 8,087,026 | B2 * | 12/2011 | Zhong ........................... 718/104 |
| 8,332,862 | B2 * | 12/2012 | Isard et al. ..................... 718/104 |
| 2004/0226015 | A1 * | 11/2004 | Leonard et al. ............... 718/100 |
| 2007/0044102 | A1 * | 2/2007 | Casotto ......................... 718/103 |
| 2007/0256077 | A1 * | 11/2007 | Zhong ........................... 718/104 |
| 2008/0022287 | A1 * | 1/2008 | Bril ............................... 718/107 |
| 2008/0103861 | A1 * | 5/2008 | Zhong ................................. 705/8 |
| 2009/0288090 | A1 * | 11/2009 | Ujibashi et al. ............... 718/103 |
| 2010/0153960 | A1 * | 6/2010 | Youn et al. .................... 718/104 |
| 2014/0007121 | A1 * | 1/2014 | Caufield et al. ............... 718/103 |

* cited by examiner

*Primary Examiner* — Emerson Puente
*Assistant Examiner* — Hiren Patel
(74) *Attorney, Agent, or Firm* — Frederique Lopez; Hoffman Warnick LLC

(57) ABSTRACT

In one embodiment, the invention provides a method of managing a computing job based on a job priority and a submitter quota, the method including determining whether a declared priority of a computing job exceeds a predetermined declared priority quota of a submitter; in the case that the declared priority of the computing job exceeds the predetermined declared priority of the submitter, substituting a reduced priority for the declared priority of the computing job; determining whether the reduced priority of the computing job exceeds a predetermined reduced priority quota for the submitter; and in the case that the reduced priority of the computing job does not exceed the predetermined reduced priority quota of the submitter, assigning the computing job to at least one computer resource at the reduced priority.

13 Claims, 5 Drawing Sheets

COMPUTING JOB MANAGEMENT BASED ON PRIORITY AND QUOTA

CROSS-REFERENCE TO RELATED APPLICATIONS

This application claims the benefit of co-pending European Patent Application No. 11305740.0, filed 14 Jun. 2011, which is hereby incorporated herein.

BACKGROUND

The present invention relates generally to the management of computing jobs and, more particularly, to managing assignment of a computing job to a computer resource based on a job priority and a quota of a submitter of the computing job.

Many computing systems are designed and operable to receive requests for execution of a computing job from more than one submitter. In such cases, it becomes important to manage the computing jobs submitted to the computing system in order to efficiently process the computing jobs and avoid monopolization or overuse of computer resources by particular submitters. Known methods of managing computing jobs typically involve scheduling the computing jobs as they are submitted in order to make most efficient use of particular resources.

For example, where a particular node of a computing system includes a number of scheduled computing jobs, a newly-submitted computing job may be diverted to another node having fewer scheduled computing jobs in order to complete processing of the newly-submitted job more quickly. Other methods may move queued computing jobs to other nodes when a new computing job is submitted in order to make more efficient use of the computer resources.

SUMMARY OF THE INVENTION

A first aspect of the invention provides a method of managing a computing job based on a job priority and a submitter quota, the method comprising: determining whether a declared priority of a computing job exceeds a predetermined declared priority quota of a submitter; in the case that the declared priority of the computing job exceeds the predetermined declared priority of the submitter, substituting a reduced priority for the declared priority of the computing job; determining whether the reduced priority of the computing job exceeds a predetermined reduced priority quota for the submitter; in the case that the reduced priority of the computing job does not exceed the predetermined reduced priority quota of the submitter, assigning the computing job to at least one computer resource at the reduced priority; and in the case that all reduced priority quotas of the submitter have been reached, assigning the computing job to at least one unused computer resource at an off-quota priority equal to the declared priority.

A second aspect of the invention provides a system comprising: at least one computing device configured for managing a computing job based on a job priority and a submitter quota by performing a method comprising: determining whether a declared priority of a computing job exceeds a predetermined declared priority quota of a submitter; in the case that the declared priority of the computing job exceeds the predetermined declared priority of the submitter, substituting a reduced priority for the declared priority of the computing job; determining whether the reduced priority of the computing job exceeds a predetermined reduced priority quota for the submitter; in the case that the reduced priority of the computing job does not exceed the predetermined reduced priority quota of the submitter, assigning the computing job to the at least one computer resource at the reduced priority; and in the case that all reduced priority quotas of the submitter have been reached, assigning the computing job to at least one unused computer resource at an off-quota priority equal to the declared priority.

A third aspect of the invention provides a program product tangibly embodied on a computer-readable storage medium for managing a computing job based on a job priority and a submitter quota, the computer-readable storage medium comprising program code for performing the following steps: determining whether a declared priority of a computing job exceeds a predetermined declared priority quota of a submitter; in the case that the declared priority of the computing job exceeds the predetermined declared priority of the submitter, substituting a reduced priority for the declared priority of the computing job; determining whether the reduced priority of the computing job exceeds a predetermined reduced priority quota for the submitter; in the case that the reduced priority of the computing job does not exceed the predetermined reduced priority quota of the submitter, assigning the computing job to the at least one computer resource at the reduced priority; and in the case that all reduced priority quotas of the submitter have been reached, assigning the computing job to at least one unused computer resource at an off-quota priority equal to the declared priority.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements among the drawings.

DETAILED DESCRIPTION OF THE INVENTION

Figure 1:
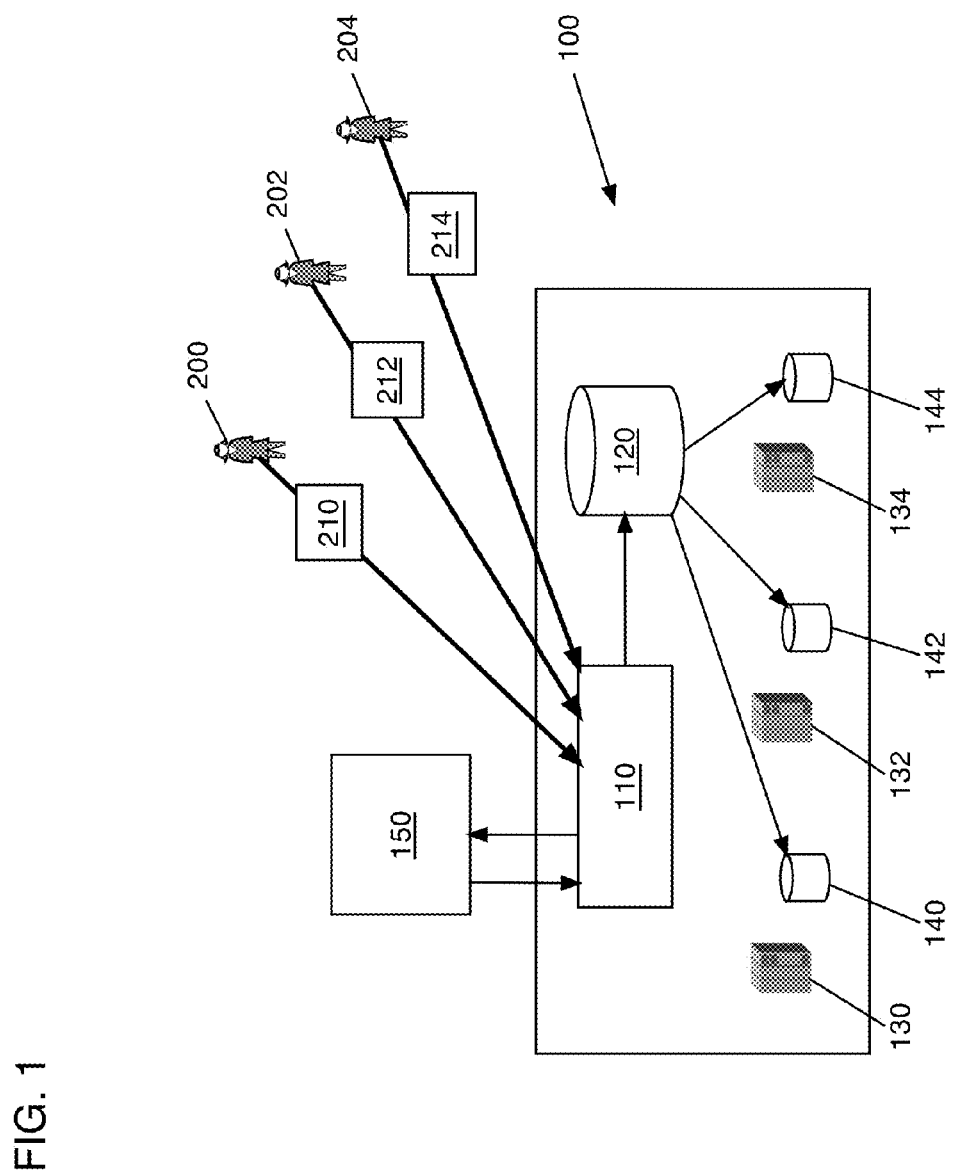
FIG. 1 shows a schematic of computing jobs being submitted to a computing system according to an embodiment of the invention.

Referring now to the drawings, FIG. 1 shows a schematic view of a computing system 100 having a dispatcher 110, a system queue 120, and a plurality of computer resources 130, 132, 134, each having a resource queue 140, 142, 144, respectively. While shown in FIG. 1 as including three resources 130, 132, 134, it is understood that computing system 100 may include any number of resources, those shown in FIG. 1 being merely for purposes of illustration.

Computing system 100 may be adapted or operable for performing any number and manner of computing tasks, depending on the use(s) to which computing system 100 will be put. For example, computing system 100 may be adapted or operable for performing computing tasks related to video production. In such a case, resource 130 may include a transcoder, a compressor/decompressor, etc., resource 132 may include a computing resource for processing audio, etc. The particular computer resources included in computing system 100 will therefore vary. However, embodiments of the invention are applicable to the management of any type of computing job and are therefore also applicable to any type of computer resource(s).

A plurality of submitters 200, 202, 204 submit computing jobs 210, 212, 214, respectively, to dispatcher 110. Submitters 200, 202, 204 may include individuals, groups of individuals, departments within an organization, a computer, or a computer system, for example, but are shown in the drawings as individuals merely for the sake of explanation.

In some cases, it may be desirable to give some submitters access to a greater or lesser proportion of resources 130, 132, 134 and/or to give some submitters a higher or lower priority in accessing resources 130, 132, 134. For example, it may be the case that submitter 200 is responsible for and submits more computing jobs than do submitter 202 or submitter 204 or that the computing jobs (e.g., computing job 210) of submitter 200 are more complex or require greater or longer use of resources 130, 132, 134. In other cases, it may be that submitter 200 has paid a premium for priority access to resources 130, 132, 134. Submitters 200, 202, 204 may be treated disparately for any reason.

Similarly, submitters 200, 202, 204 may give particular computing jobs a higher or lower priority, whether compared to all computing jobs submitted to computing system 100 or other computing jobs submitted by a submitter. For example, just as a particular submitter may be given disparate access to resources 130, 132, 134, so too may individual computing jobs of a particular submitter.

Figure 2:
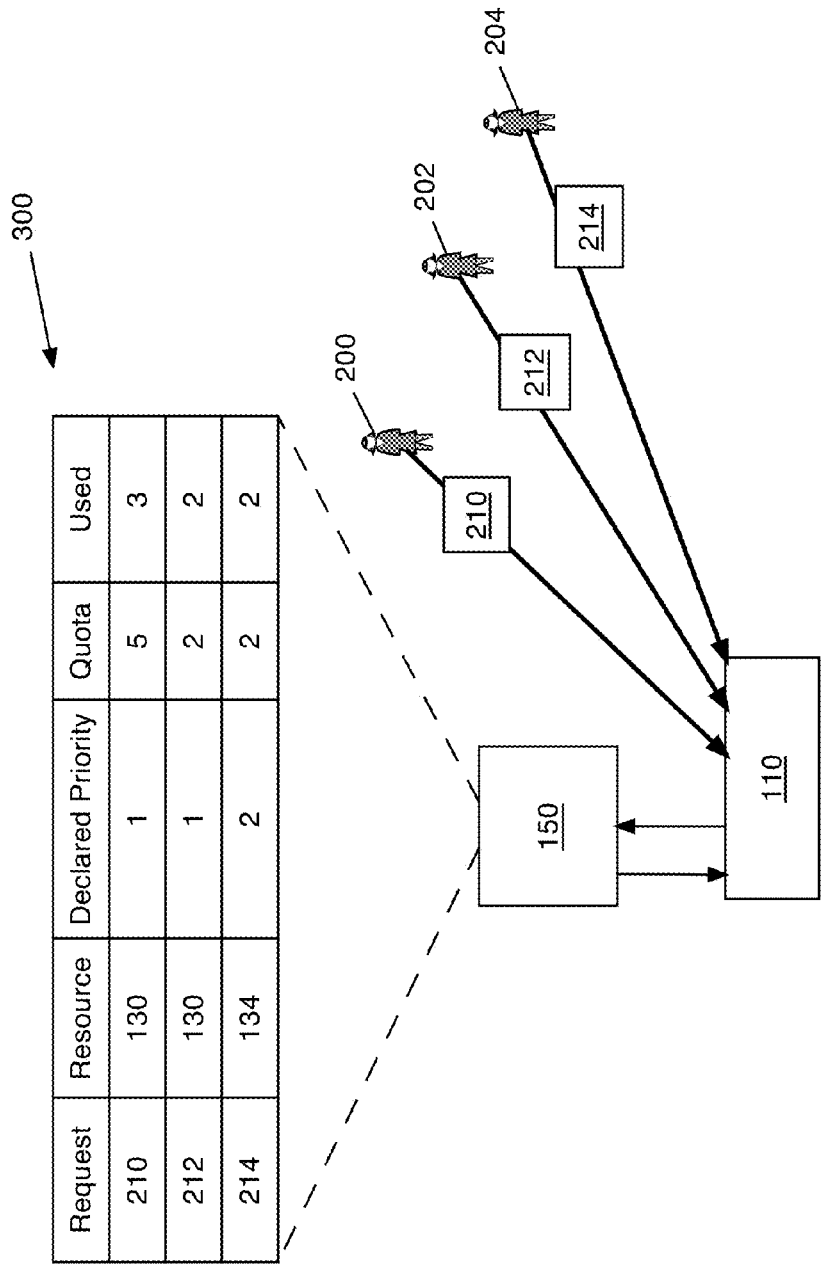
FIG. 2 shows a detailed portion of FIG. 1.

Upon submission of computing jobs 210, 212, 214 by submitters 200, 202, 204, respectively, to dispatcher 110, a rule processor 150 may be employed to determine how computing jobs 210, 212, 214 will be assigned to resources 130, 132, 134. For example, FIG. 2 shows a table 300 related to the determinations of rule processor 150. As can be seen in FIG. 2, computing job 210 requires use of resource 130 and has been given a "declared priority," i.e., the priority given by submitter 200, of "1." Relative priorities may be designated in any number of ways (e.g., "high," "medium," "low"), the numeric priorities shown in FIG. 2 being just one example.

In table 300, it can be seen that submitter 200 has a quota of five requests. This quota may represent, for example, the permitted number of simultaneously active computing jobs at the declared priority, a daily limit of computing jobs at a declared priority, a daily limit of all submitted computing jobs, etc. Merely for the sake of explanation, the quota shown in table 300 will refer to the permitted number of simultaneously active computing jobs at the declared priority. As such, it can be seen in FIG. 2 that submitter 200 has used three of the five "priority 1" computing jobs allowed by the quota. In contrast, it can be seen that submitter 202 (the submitter of computing job 212) has used the two "priority 1" computing jobs allowed by the quota for submitter 202 and submitter 204 (the submitter of computing job 214) has used the two "priority 2" computing jobs allowed by the quota for submitter 204.

According to embodiments of the invention, management of computing jobs 210, 212, 214 depends not just on their declared priorities and the quotas of their submitters, but also on the predetermined priority order by which computing jobs will be assigned to resources. For example, according to one such predetermined priority order, all computing jobs with a priority of "1" and a submitter who has not already reached a quota for that priority may be assigned to resources first, followed by computing jobs with a priority of "2" and a submitter who has not already reached a quota for that priority, etc. After all computing jobs from submitters who have not reached their quotas are assigned, the predetermined priority order may then give priority to "off quota" computing jobs with a priority of "1." As used herein, an "off quota" computing job is intended to refer to computing jobs having a particular priority, but submitted by a submitter who has already reached a quota for that priority.

Other predetermined priority orders are possible, of course. For example, it may be desirable, in some circumstances, to give greater priority to computing jobs with the highest priority, regardless of whether the submitter has already reached a quota for the priority. That is, it may be desirable to give priority to an off quota priority 1 computing job over a priority 2 computing job that is not off quota.

Figure 3:
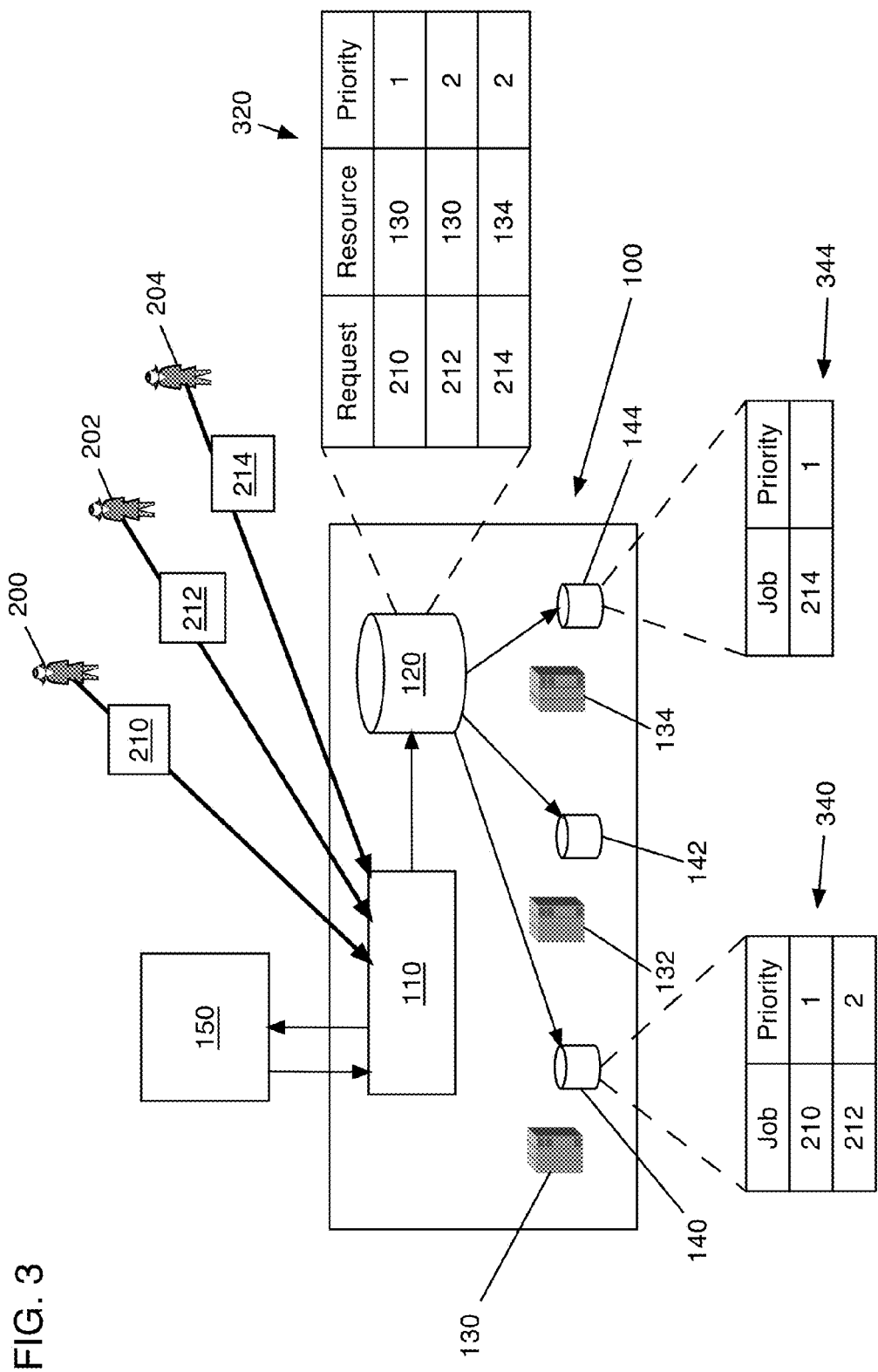
FIG. 3 shows management and assignment of computing jobs to resources according to an embodiment of the invention.

FIG. 3 shows computing system 100 according to an embodiment of the invention, wherein management of computing jobs 210, 212, 214 includes reducing a declared priority if the submitter has reached a quota for that priority. For example, referring back to FIG. 2, it can be seen in table 300 that computing job 212 was given a declared priority of 1, but that its submitter 212 has already reached the quota for that priority. Accordingly, rule processor 150 reduces the priority of computing job 212 to 2. If submitter 212 has also reached its quota of priority 2 computing jobs, the priority of computing job 212 may be further reduced to 3, and so on. In FIG. 3, submitter 212 has not reached its quota for priority 2 computing jobs, so rule processor 150 forwards computing job 212 to dispatcher 110 with a priority of 2. Dispatcher 110 stores queued computing jobs in system queue 120. These stored computing jobs are shown in table 320. As can be seen in table 320, computing job 212, which had a declared priority of 1 in table 300 (FIG. 2), has a priority of 2 in table 320, the priority having been reduced by rule processor 150 as described above.

Still referring to FIG. 3, it can be seen that individual resource queues 140, 142, 144 store computing jobs from system queue 120 and queued for their corresponding resources 130, 132, 134, respectively. Computing jobs in resource queues 140 and 144 are shown in tables 340 and 344, respectively. As can be seen in table 340, computing job 212, which had its declared priority of 1 reduced to a priority of 2, as described above, is queued behind computing job 210, which also had a declared priority of 1, the priority of which was not reduced. If, however, circumstances had been such that the submitter 200 of computing job 210 had reached the quotas for priority 1 and priority 2 computing jobs, its priority would have been reduced, for example, to 3 or to an off quota priority, computing job 210 then would have been queued behind computing job 212.

Figure 4:
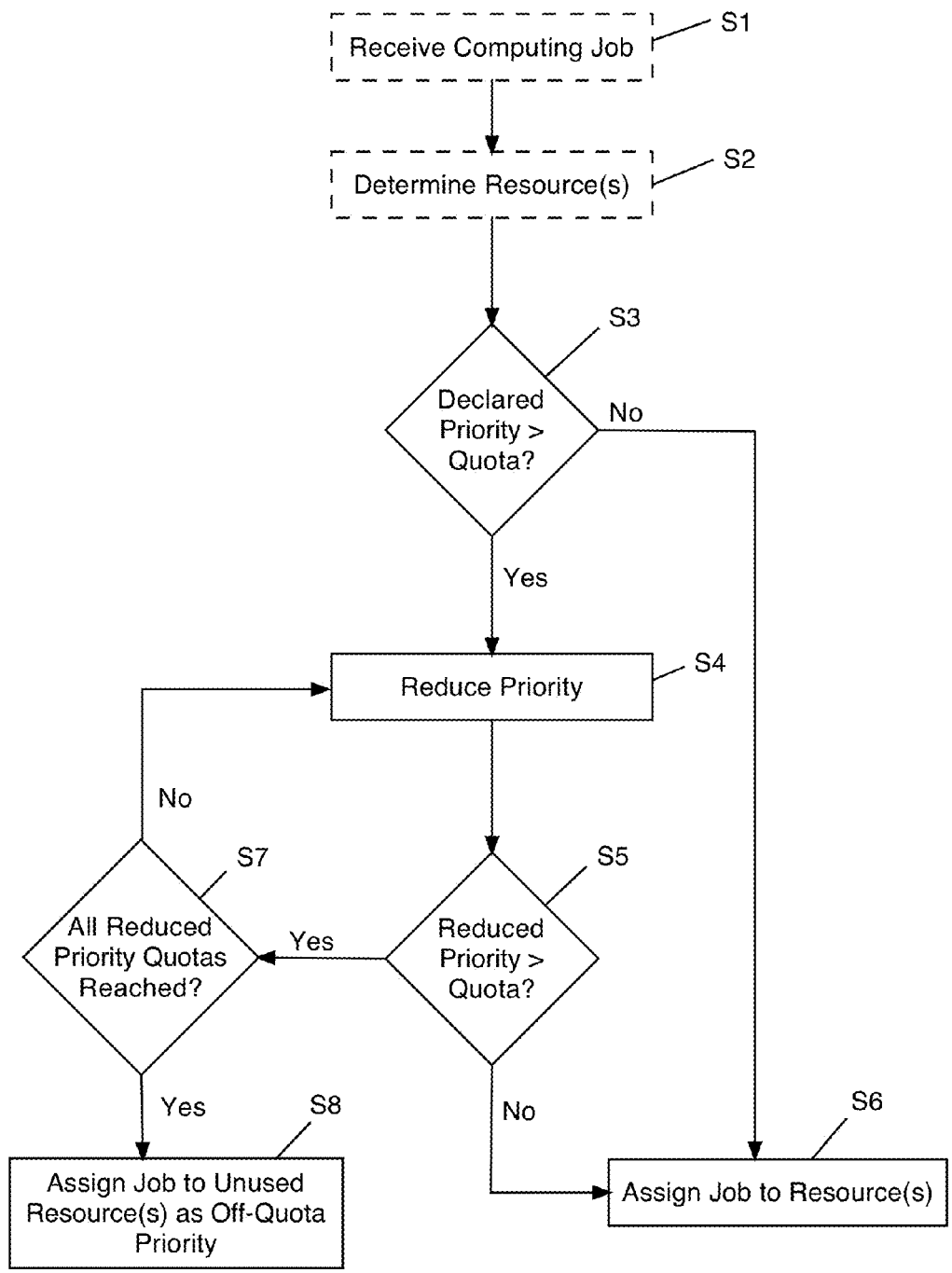
FIG. 4 shows a flow diagram of a method according to an embodiment of the invention.

FIG. 4 shows a flow diagram of a method according to an embodiment of the invention. At optional step S1, a computing system 100 may receive a computing job and, at S2, optionally determine one or more computer resource(s) for performing the computing job.

At S3, it is determined whether a declared priority of the computing job has exceeded the submitter's quota for that priority. If not (i.e., No at S3), then the computing job may be assigned to the resource(s) at S6 at the declared priority. If the declared priority has exceeded the quota (i.e., Yes at S3), the priority of the computing job is reduced at S4.

It may then be determined at S5 whether the reduced priority exceeds the submitter's quota for that reduced priority. If not (i.e., No at S5), the computing job may be assigned to the resource(s) at S6 at the reduced priority. If the computing job, at the reduced priority, would exceed the quota for the reduced priority (i.e., Yes at S5), it may be determined at S7 whether all reduced priorities would exceed the respective quotas for the submitter. If not (i.e., No at S7), flow returns to S4 and the reduced priority is reduced to a further-reduced priority, with S5, S7, and S4 then iteratively looped until a "No" is obtained at S5 and the computing job is assigned at S6 at whatever further-reduced priority is ultimately determined not to exceed the submitter's quota.

If it is determined that all reduced priorities would exceed the respective quotas for the submitter (i.e., Yes at S7), then, at S8, the computing job may be assigned as an off quota priority to an unused resource(s) when such resource(s) becomes available. In some embodiments of the invention, the off quota priority of such a computing job is equal to the declared priority of the computing job.

Determining whether all reduced priorities would exceed the respective quotas for the submitter at S7 is neither necessary nor essential, although it does aid in more efficient management of computing jobs. For example, if it can be determined whether a submitter has met all priority quotas and that further reductions of priority would not facilitate assigning a computing job to a resource at any priority (i.e., assigning at S6), then the computing job may be diverted out of the main flow of FIG. 4 and assigned as an off quota priority at S8, thus avoiding what would ultimately be futile iterations of S4 and S5.

Similarly, although S7 is shown as determining whether all reduced priorities would exceed the respective quotas for the submitter, other determining steps may be performed in its place or in addition. For example, rather than or upon determining that all reduced priorities have not been reached (i.e., No at S7), it may be desirable, in some embodiments of the invention, to determine which reduced priorities have unmet quotas. In such an embodiment, rather than iteratively looping S5, S7, and S4, the priority of the computing job could be immediately reduced to the highest reduced priority with an unmet quota, resulting in a "No" at S5 and assignment of the computing job at S6.

Figure 5:
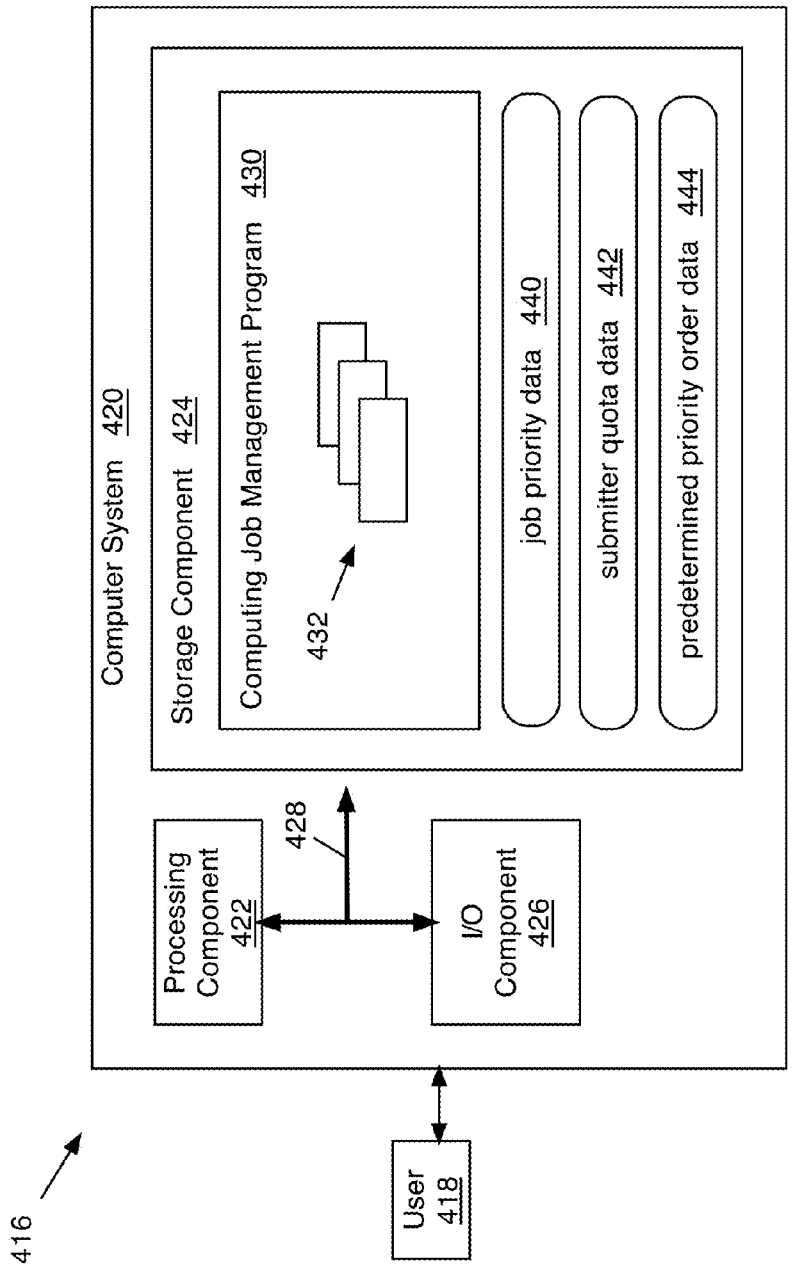
FIG. 5 shows a system according to an embodiment of the invention.

FIG. 5 shows an illustrative environment 416 for managing a computing job 210. To this extent, environment 416 includes a computer system 420 that can perform a process described herein in order to manage a computing job. In particular, computer system 420 is shown including a computing job management program 430, which makes computer system 420 operable to manage a computing job 210 by by performing a process described herein.

Computer system 420 is shown including a processing component 422 (e.g., one or more processors), a storage component 424 (e.g., a storage hierarchy), an input/output (I/O) component 426 (e.g., one or more I/O interfaces and/or devices), and a communications pathway 428. In general, processing component 422 executes program code, such as computing job management program 430, which is at least partially fixed in storage component 424. While executing program code, processing component 422 can process data, which can result in reading and/or writing transformed data from/to storage component 424 and/or I/O component 426 for further processing. Pathway 428 provides a communications link between each of the components in computer system 420. I/O component 426 can comprise one or more human I/O devices, which enable a human user, such as user 418, to interact with computer system 420 and/or one or more communications devices to enable a system user (e.g., another computer system used to interact with user 418) to communicate with computer system 420 using any type of communications link. To this extent, computing job management program 430 can manage a set of interfaces (e.g., graphical user interface(s), application program interface, and/or the like) that enable human and/or system users to interact with computing job management program 430. Further, computing job management program 430 can manage (e.g., store, retrieve, create, manipulate, organize, present, etc.) the data, such as job priority data 440, submitter quota data 442, and predetermined priority order data 444 using any solution.

In any event, computer system 420 can comprise one or more general purpose computing articles of manufacture (e.g., computing devices) capable of executing program code, such as computing job management program 430, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, computing job management program 430 can be embodied as any combination of system software and/or application software.

Further, computing job management program 430 can be implemented using a set of modules 432. In this case, a module 432 can enable computer system 420 to perform a set of tasks used by computing job management program 430, and can be separately developed and/or implemented apart from other portions of computing job management program 430. As used herein, the term "component" means any configuration of hardware, with or without software, which implements the functionality described in conjunction therewith using any solution, while the term "module" means program code that enables a computer system 420 to implement the actions described in conjunction therewith using any solution. When fixed in a storage component 424 of a computer system 420 that includes a processing component 422, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 420.

When computer system 420 comprises multiple computing devices, each computing device can have only a portion of computing job management program 430 fixed thereon (e.g., one or more modules 432). However, it is understood that computer system 420 and computing job management program 430 are only representative of various possible equivalent computer systems that may perform a process described herein. To this extent, in other embodiments, the functionality provided by computer system 420 and computing job management program 430 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 420 includes multiple computing devices, the computing devices can communicate over any type of communications link. Further, while performing a process described herein, computer system 420 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, computing job management program 430 enables computer system 420 to manage a computing job 210 and its assignment to computer resources 130, 132, 134 (FIG. 1) based on a job priority and quota(s) of the submitter 200. To this extent, computer system 420 can acquire and/or utilize information before, during, and after managing the computing job 210.

For example, computer system 420 can acquire and/or utilize job priority data 440 corresponding to computing job 210. The job priority data 440 can comprise various information regarding computing job 210, including, in particular, a declared priority given computing job 210 by submitter 200.

Computer system 420 also can acquire and/or utilize submitter quota data 442, which can include various information regarding submitter 210. In particular, submitter quota data 442 may include set quotas for the number of computing jobs at various priorities that submitter 210 is permitted to submit for assignment and processing. Similarly, computer system 420 also can acquire and/or utilize predetermined priority order data 444, which can include information regarding the relative priorities to be given to computing jobs (e.g., priority 1 jobs first, priority 2 jobs second, . . . off quota priority 3 jobs last).

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. To this extent, program code can be embodied as one or more types of program products, such as an application/software program, component software/a library of functions, an operating system, a basic I/O system/driver for a particular computing and/or I/O device, and the like.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of managing a computing job based on a job priority and a submitter quota, the method comprising:
   determining whether a declared priority of the computing job is a minimum priority;
   in the case that the declared priority of the computing job is the minimum priority, assigning the computing job to at least one computer resource at the declared priority;
   in the case that the declared priority of the computing job is not the minimum priority:
   determining whether the declared priority of the computing job exceeds a remaining portion of a predetermined declared priority quota of a submitter;
   in the case that the declared priority of the computing job exceeds the remaining portion of the predetermined declared priority quota of the submitter, substituting a reduced priority for the declared priority of the computing job;
   determining whether the reduced priority of the computing job exceeds a remaining portion of a predetermined reduced priority quota for the submitter;
   in the case that the reduced priority of the computing job does not exceed the remaining portion of the predetermined reduced priority quota of the submitter, assigning the computing job to the at least one computer resource at the reduced priority;
   in the case that the reduced priority of the computing job exceeds the remaining portion of the predetermined reduced priority quota of the submitter, substituting a further-reduced priority for the reduced priority of the computing job;
   determining whether the further-reduced priority of the computing job exceeds a remaining portion of a predetermined further-reduced priority of the submitter;
   in the case that the further-reduced priority of the computing job does not exceed the remaining portion of the predetermined further-reduced priority quota of the submitter, assigning the computing job to the at least one computer resource at the further-reduced priority; and
   in the case that the predetermined declared priority quota, the predetermined reduced priority quota and the predetermined further-reduced priority quota of the submitter have been reached, assigning the computing job to at least one unused computer resource at an off-quota priority equal to the declared priority.

2. The method of claim 1, further comprising:
   receiving from the submitter the computing job having the declared priority, the reduced priority, or the further-reduced priority; and
   determining the at least one computer resource for performing the computing job.

3. The method of claim 1, further comprising:
   in the case that the declared priority of the computing job does not exceed the remaining portion of the predetermined declared priority quota of the submitter, assigning the computing job to the at least one computer resource at the declared priority.

4. The method of claim 1, wherein assigning the computing job to the at least one computer resource includes ordering the computing job within a queue associated with the at least one computer resource, wherein the queue includes at least one additional computing job having at least one of the following: a priority other than the reduced priority or a submitter other than the submitter of the computing job.

5. The method of claim 4, wherein ordering the computing job includes ordering the computing job and the at least one additional computing job according to a predetermined priority order.

6. A system comprising:
at least one computing device configured for managing a computing job based on a job priority and a submitter quota by performing a method comprising:
determining whether a declared priority of the computing job is a minimum priority;
in the case that the declared priority of the computing job is the minimum priority, assigning the computing job to the at least one computer resource at the declared priority;
in the case that the declared priority of the computing job is not the minimum priority:
determining whether the declared priority of the computing job exceeds a remaining portion of a predetermined declared priority quota of a submitter;
in the case that the declared priority of the computing job exceeds the remaining portion of the predetermined declared priority quota of the submitter, substituting a reduced priority for the declared priority of the computing job;
determining whether the reduced priority of the computing job exceeds a remaining portion of a predetermined reduced priority quota for the submitter;
in the case that the reduced priority of the computing job does not exceed the remaining portion of the predetermined reduced priority quota of the submitter, assigning the computing job to the at least one computer resource at the reduced priority;
in the case that the reduced priority of the computing job exceeds the remaining portion of the predetermined reduced priority quota of the submitter, substituting a further-reduced priority for the reduced priority of the computing job;
determining whether the further-reduced priority of the computing job exceeds a remaining portion of a predetermined further-reduced priority of the submitter;
in the case that the further-reduced priority of the computing job does not exceed the remaining portion of the predetermined further-reduced priority quota of the submitter, assigning the computing job to the at least one computer resource at the further-reduced priority; and
in the case that the predetermined declared priority quota, the predetermined reduced priority quota and the predetermined further-reduced priority quota of the submitter have been reached, assigning the computing job to at least one unused computer resource at an off-quota priority equal to the declared priority.

7. The system of claim 6, wherein the method further comprises:
receiving from the submitter the computing job having the declared priority, the reduced priority, or the further-reduced priority; and
determining the at least one computer resource for performing the computing job.

8. The system of claim 7, wherein assigning the computing job to the at least one computer resource includes ordering the computing job within a queue associated with the at least one computer resource, wherein the queue includes at least one additional computing job having at least one of the following: a priority other than the reduced priority or a submitter other than the submitter of the computing job.

9. The system of claim 8, wherein ordering the computing job includes ordering the computing job and the at least one additional computing job according to a predetermined priority order.

10. A program product tangibly embodied on a non-transitory computer-readable storage medium for managing a computing job based on a job priority and a submitter quota, the computer-readable storage medium comprising program code for performing the following steps:
determining whether a declared priority of the computing job is a minimum priority;
in the case that the declared priority of the computing job is the minimum priority, assigning the computing job to at least one computer resource at the declared priority;
in the case that the declared priority of the computing job is not the minimum priority:
determining whether the declared priority of the computing job exceeds a remaining portion of a predetermined declared priority quota of a submitter;
in the case that the declared priority of the computing job exceeds the remaining portion of the predetermined declared priority quota of the submitter, substituting a reduced priority for the declared priority of the computing job;
determining whether the reduced priority of the computing job exceeds a remaining portion of a predetermined reduced priority quota for the submitter;
in the case that the reduced priority of the computing job does not exceed the remaining portion of the predetermined reduced priority quota of the submitter, assigning the computing job to the at least one computer resource at the reduced priority;
in the case that the reduced priority of the computing job exceeds the remaining portion of the predetermined reduced priority quota of the submitter, substituting a further-reduced priority for the reduced priority of the computing job;
determining whether the further-reduced priority of the computing job exceeds a remaining portion of a predetermined further-reduced priority of the submitter;
in the case that the further-reduced priority of the computing job does not exceed the remaining portion of the predetermined further-reduced priority quota of the submitter, assigning the computing job to the at least one computer resource at the further-reduced priority; and
in the case that the predetermined declared priority quota, the predetermined reduced priority quota and the predetermined further-reduced priority quota of the submitter have been reached, assigning the computing job to at least one unused computer resource at an off-quota priority equal to the declared priority.

11. The program product of claim 10, wherein the computer-readable storage medium further comprises program code for performing the following steps:
receiving from the submitter the computing job having the declared priority, the reduced priority, or the further-reduced priority; and
determining the at least one computer resource for performing the computing job.

12. The program product of claim 10, wherein assigning the computing job to the at least one computer resource includes ordering the computing job within a queue associated with the at least one computer resource, wherein the queue includes at least one additional computing job having at least one of the following: a priority other than the reduced priority or a submitter other than the submitter of the computing job.

13. The program product of claim 12, wherein ordering the computing job includes ordering the computing job and the at least one additional computing job according to a predetermined priority order.

* * * * *